United States Patent
Li

(10) Patent No.: US 7,835,687 B2
(45) Date of Patent: Nov. 16, 2010

(54) JAMMING DETECTOR AND JAMMING DETECTING METHOD

(75) Inventor: Kuan-i Li, Kaohsiung (TW)

(73) Assignee: MEDIATEK Inc., Hsin-Chu (TW)

( * ) Notice: Subject to any disclaimer, the term of this patent is extended or adjusted under 35 U.S.C. 154(b) by 497 days.

(21) Appl. No.: 11/874,728

(22) Filed: Oct. 18, 2007

(65) Prior Publication Data

US 2009/0104869 A1 Apr. 23, 2009

(51) Int. Cl.
*H04K 3/00* (2006.01)
(52) U.S. Cl. ............... 455/1; 455/423; 455/296; 455/63.1
(58) Field of Classification Search ............ 455/1, 455/278.1, 63.1, 296, 214, 276.1, 272, 67.13, 455/280, 423, 424, 425, 63.2, 67.11, 501, 455/509; 375/150, 367, 346, 334
See application file for complete search history.

(56) References Cited

U.S. PATENT DOCUMENTS

| 5,734,674 A | * | 3/1998 | Fenton et al. ............ 375/150 |
| 6,704,557 B1 | * | 3/2004 | Krishnamurthy et al. . 455/278.1 |
| 2006/0188033 A1 | * | 8/2006 | Zehavi et al. ............ 375/260 |
| 2008/0084345 A1 | * | 4/2008 | Rougas et al. ............ 342/14 |

* cited by examiner

*Primary Examiner*—John Lee

(57) ABSTRACT

A jamming detector and jamming detecting method are disclosed. In accordance with the present invention, distribution of a received signal is compared with a reference distribution of a specific signal model. Deviation of the signal distribution from the reference distribution can be obtained according to the comparison results. The existence of jamming is determined according to the deviation. If the signal distribution significantly deviates from the reference distribution, it means that jamming exists. An anti-jamming circuit or algorithm can be activated only when jamming is detected, thereby power consumption is reduced.

15 Claims, 5 Drawing Sheets

JAMMING DETECTOR AND JAMMING DETECTING METHOD

TECHNICAL FIELD OF THE INVENTION

The present invention relates to anti-jamming for a CDMA-like receiver, more particularly, to a jamming detection for the receiver.

BACKGROUND OF THE INVENTION

RF interference, which is also referred to as "jamming", sometimes occurs when a CDMA-like system (such as GNSS) receiver operates. Jamming may be caused by various sources such as channel cohabitance, harmonics from mobile phones, satellites, TV, FM radio, radar and hostile sources. Jamming may surreptitiously degrade accuracy of the receiver and damage the integrity of the receiver. An automatic gain control (AGC) circuit in the receiver keeps the receiver in its optimized operating range by detecting the overall strength of the signal and automatically adjusting the gain of the receiver to maintain an approximately constant average output power level. To design the behavior of the AGC circuit, the input signal characteristics must be taken into consideration to minimize the SNR degradation caused by quantization. For example, an AGC unit of a GNSS receiver usually utilizes a specific input signal model such as Gaussian model. When there is jamming incorporated into the input signal, the AGC unit cannot perform well for the predetermined input signal model, which may cause further signal distortion. Similarly, other functions of the receiver, such as signal acquisition ability and navigation accuracy, may also be influenced by the jamming. Therefore, anti-jamming operation is required. However, it is a waste of power if jamming mitigation function is always activated since jamming occurs occasionally. The signaling environment may often be jamming-free. Executing anti-jamming operation during jamming-free period is a significant waste of power. It will be more economic and efficient if the anti-jamming operation is only executed when there is indeed jamming in the input signal. Therefore, an effective jamming detection scheme is necessary.

SUMMARY OF THE INVENTION

In accordance with the present invention, the amplitude or power distribution of a received signal is compared with a reference distribution of a specific signal model, which can be obtained from signal probability distribution function (PDF) or cumulated distribution function (CDF) or statistical experiments. If the signal distribution is very different from the reference distribution, it means that jamming is present. To compare the signal distribution and the reference distribution, the reference distribution is divided into several steps according to signal magnitudes, for example. The actual samples of each step of the received signal are counted and the counted result is compared with an expected value. Then, deviation of the signal distribution from the reference distribution can be obtained according to the comparison results. The existence of jamming is determined according to the deviation.

DETAILED DESCRIPTION OF THE INVENTION

Figure 1:
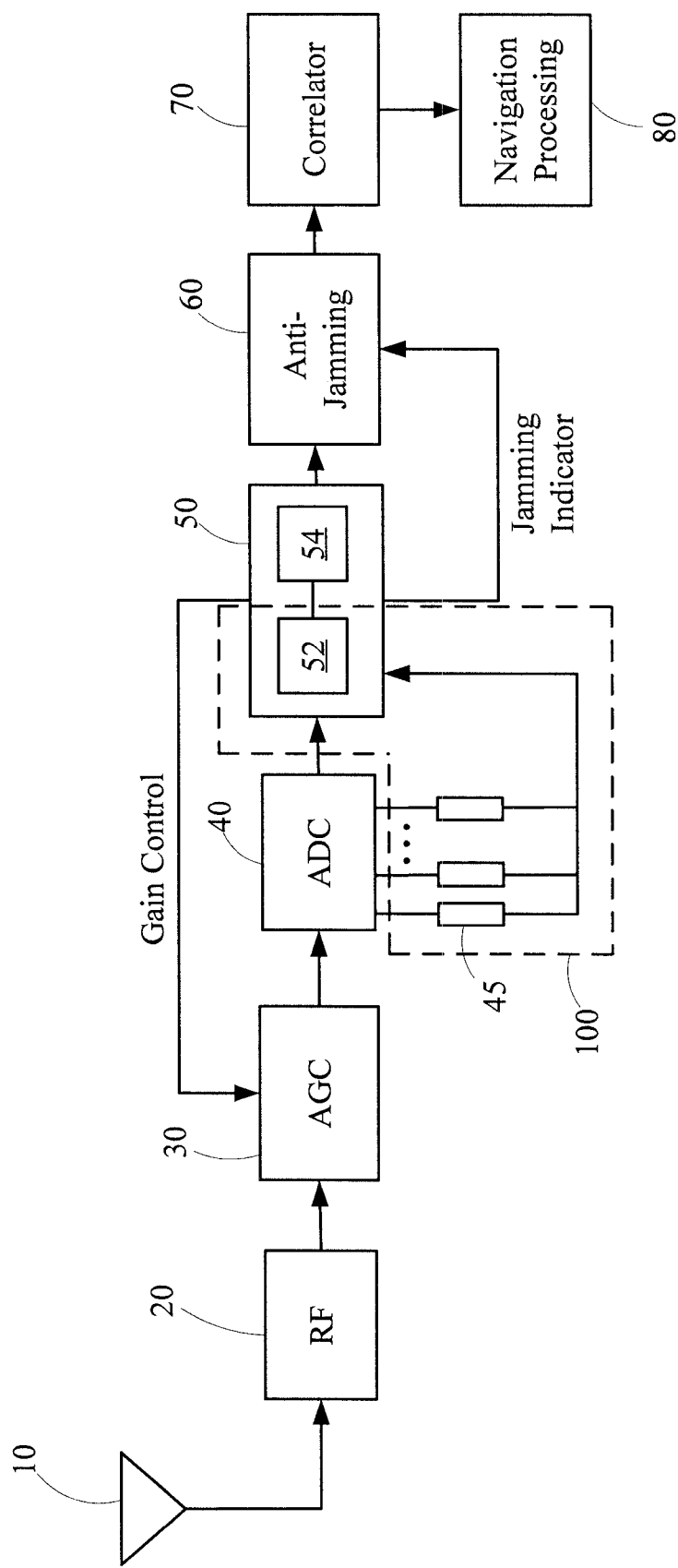
FIG. 1 is a block diagram schematically showing a receiver with jamming detection function in accordance with the present invention.
Figure 2A:
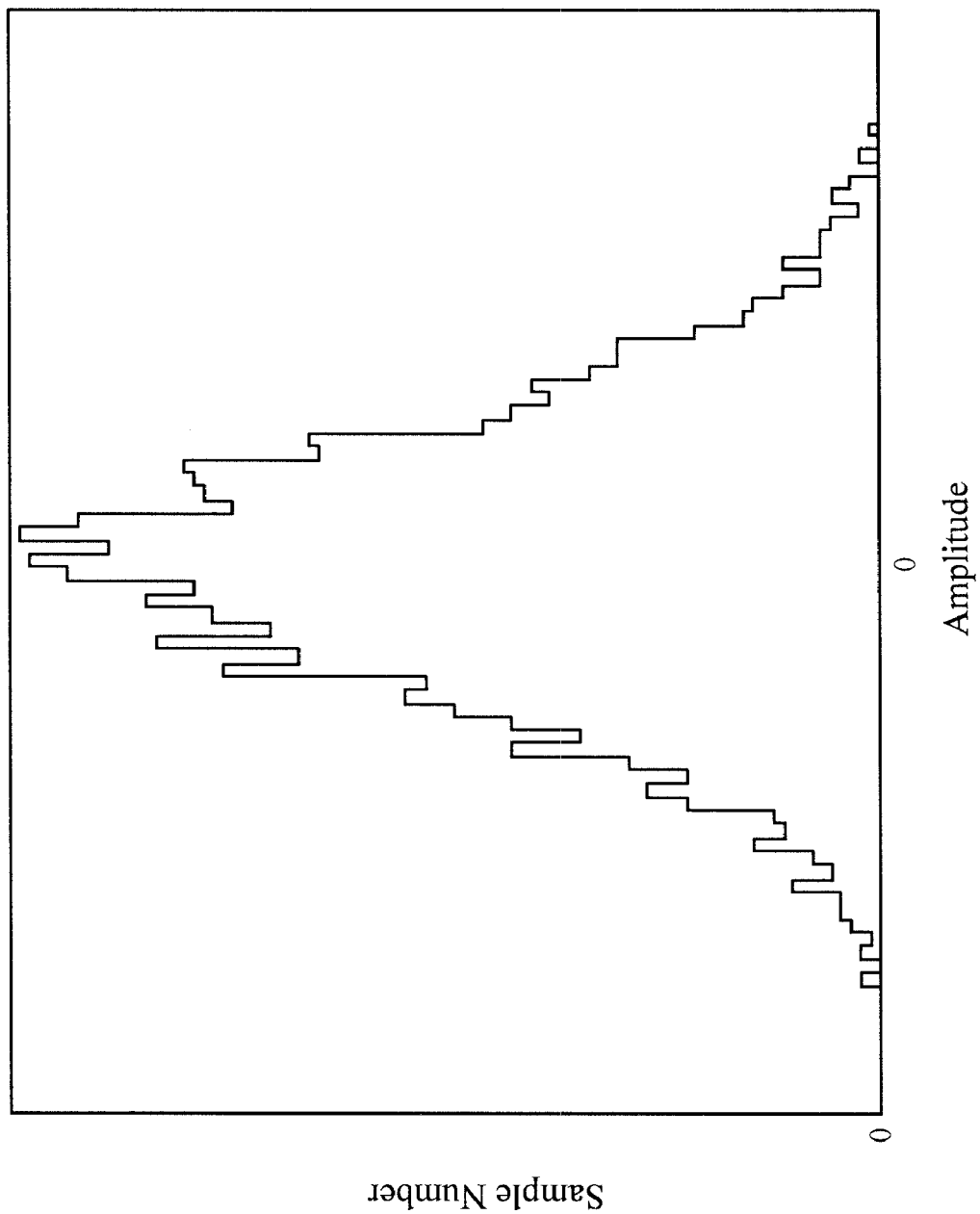
FIGS. 2A and 2B are diagrams respectively and schematically illustrating different signal models.
Figure 2B:
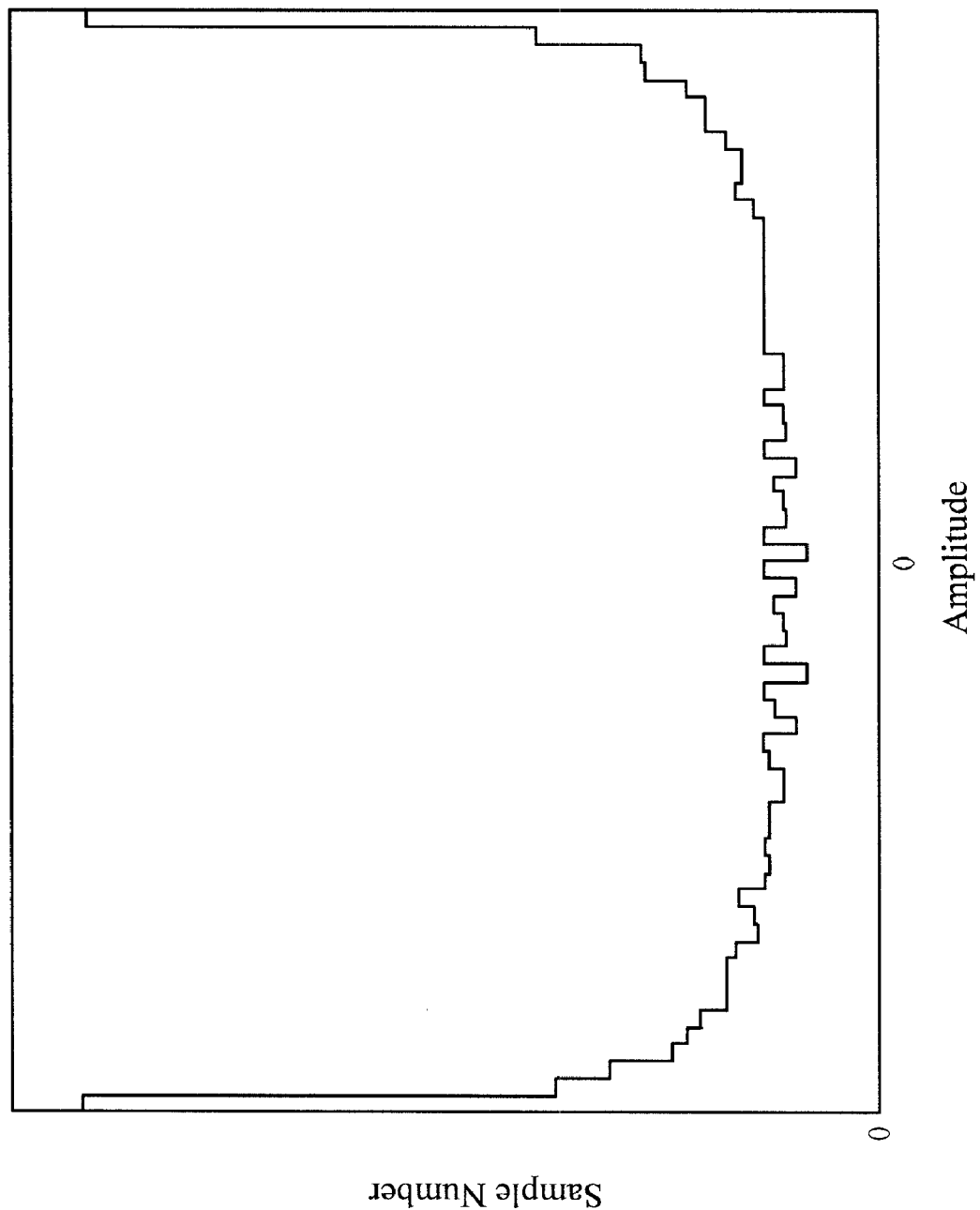

FIG. 1 is a block diagram schematically showing a receiver with jamming detection function in accordance with the present invention. The receiver includes an antenna (or antenna group) 10 for receiving RF (radio frequency) signals, an RF processing unit 20 for processing the RF signals such as filtering out noises, amplifying the amplitudes and converting the RF signals into IF (intermediate frequency) signals. The receiver further has an AGC (automatic gain control) unit 30 for adjusting the amplitude of the signal. To achieve optimal performance such as minimizing SNR degradation, the AGC unit 30 is often designed based on a specific signal model. The signal model may be white noise (also referred to as Gaussian or normal distribution) signal model as shown in FIG. 2A, or single-tone sine wave signal model as shown in FIG. 2B. The output signal of the AGC unit 30 is passed to an ADC (analog-to-digital converter) 40. The ADC 40 samples the signal into digital samples for successive processing.

In accordance with of the present invention, the receiver further has a plurality of counters 45 to count the number of samples of different amplitude steps. That is, the magnitude distribution of the signal is divided into several steps, each step is defined with an amplitude range. The corresponding counters are used to count actual numbers of samples which fall in respective steps.

Figure 3:
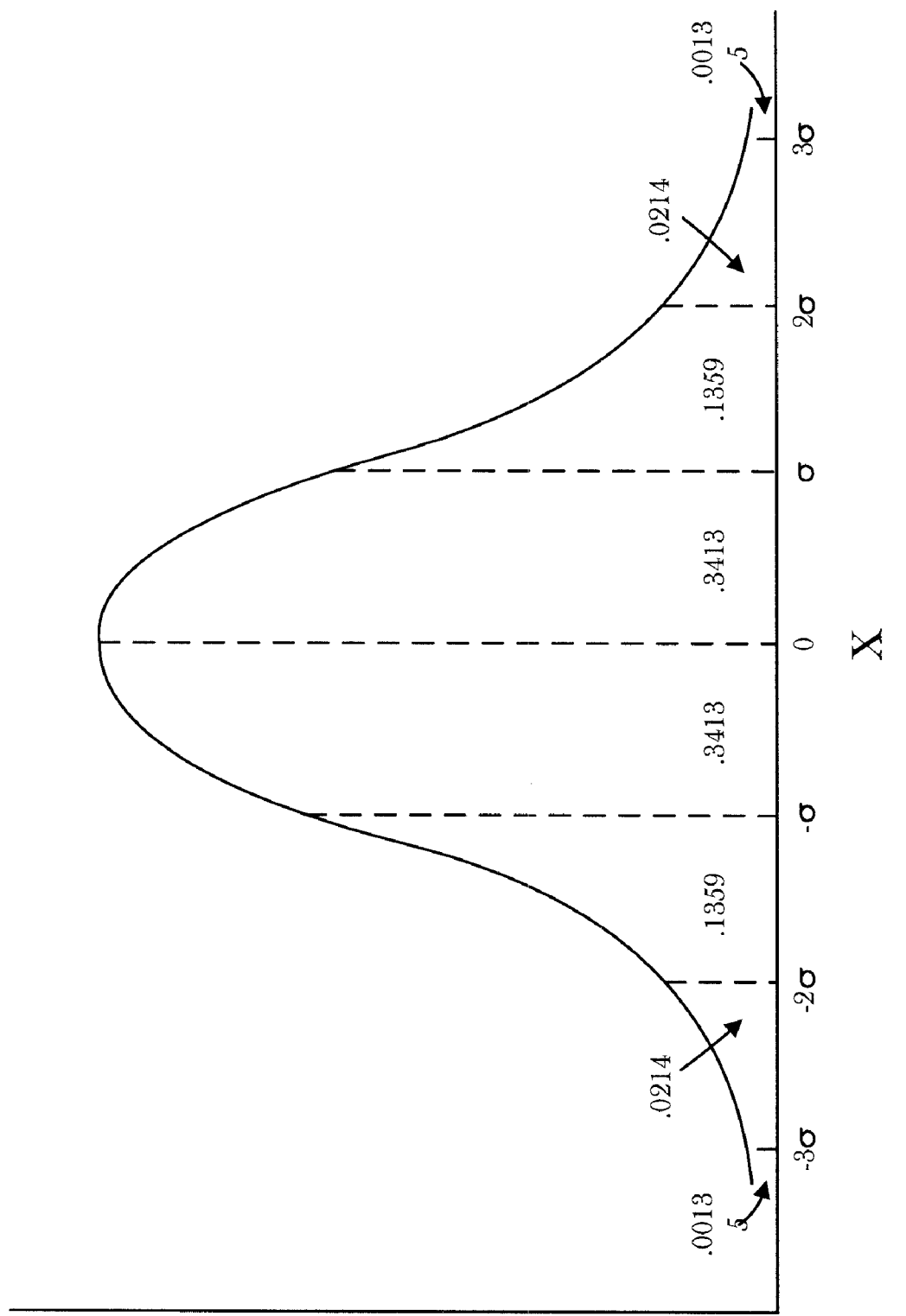
FIG. 3 is a diagram showing a probability distribution of Gaussian random variable.

In the present embodiment, it is assumed that the signal model utilized by the AGC unit 30 in a GNSS receiver is zero-mean Gaussian model. FIG. 3 shows a probability distribution of Gaussian random variable. For example, if the amplitude distribution is classified into 8 steps (each step size equals to the signal standard deviation), for 10,000 samples, there should be 135 samples falling into the first step, 214 samples falling into the second step, 1359 samples falling into the third step, 3413 samples falling into the fourth step, 3413 sample falling into the fifth step, 1359 sample falling into the sixth step, 214 sample falling into the seventh step, and 135 sample falling into the eighth step. The above values are called expected step counts $H_i$ (i=1 to 8). Therefore, in the present embodiment, the receiver contains eight counters 45 to count the samples of eight step. However, it is also possible to use other numbers of counters 45. For example, the receiver may contain four counters 45, and each counter counts the samples of two adjacent steps. Other arrangement can also be used.

The receiver further has a gain control & jamming detection unit 50. The gain control & jamming detection unit 50 has a jamming detection part 52 and a gain control part 54. In practice, these two parts can be implemented by different blocks or implemented by the same block executing both functions. The counters 45 respectively count the actual samples of the signal falling in the respective steps and notify the gain control & jamming detection unit 50 with the results. The jamming detection unit 50 compares the actual results with the ideal values or measures the discrepancy between two distributions to determine whether there is jamming incorporated with the signal. If the actual results indicate that input sample distribution is very different from the reference one, the gain control & jamming detection unit 50 determines that jamming is detected. Then, the gain control & jamming detection unit 50 generates a jamming indicator and passes the same to an anti-jamming unit 60, so that the anti-jamming unit 60 can be activated to eliminate the jamming. When receiving the jamming indicator indicating that jamming is detected, the anti-jamming unit 60 may eliminate the jamming by any proper schemes. For example, the anti-jamming unit 60 can utilize a frequency domain approach such as FFT (Fast Fourier Transform) to remove jamming in frequency domain. Alternatively, the anti-jamming unit 60 can utilize a time domain approach such as an adaptive filter to filter out the jamming and remove the jamming from the input signal. In the field of anti-jamming, there are various schemes available, and any of them can be applied in the anti-jamming unit 60.

After the jamming is removed from the signal, the clean signal is passed to a correlator 70 executing correlation. The output of correlator 70 is passed to a processor to execute operations such as signal acquisition and signal tracking.

The gain control & jamming detection unit 50 also generates a gain control signal according to the counter results. The gain control & jamming detection unit 50 sends the gain control signal to the AGC 30 to control the AGC unit 30. For example, if the signal is un-jammed, the gain control part 54 of the gain control & jamming detection unit 50 can adjust the gain of the AGC unit 30 so that the sample distribution in each ADC step approximates the reference distribution. Furthermore, when jamming is detected, the AGC unit 30 can switch from a current mode to another mode, which is more appropriate for the current signal. However, the gain control & jamming detection unit 50 may also generate a control signal for controlling other components of the receiver.

The counters 45 and the jamming detection part 52 of the gain control & jamming detection unit 50 can be considered together and referred to as a jamming detector 100, as indicated in FIG. 1. The counters are used as a distribution measurement part of the jamming detector 100 to measure the amplitude distribution of the received signal by counting the sample number of each step. The jamming detector 100 checks the output of the ADC 40 to determine whether there is jamming or not. If so, the jamming detector 100 notifies the anti-jamming unit 60. Then the anti-jamming unit 60 properly operates to remove or reduce the jamming accordingly. By the provision of the jamming detector, the anti-jamming unit 60 does not need to always be in the operating mode. Instead, the anti-jamming unit 60 only operates when the jamming indicator indicates that there is jamming. Therefore, unnecessary power consumption can be avoided.

The signal distribution is represented by amplitude histogram, that is, the signal distribution is classified into several groups by sample amplitude, and there are counters to count the sample numbers falling into each group. There are various ways to classify the groups. The amplitude groups can be divided into multiple ADC steps. It is possible that just a few MSB (most significant bits) of the ADC steps are used. Moreover, the amplitude group division can be done in software. In the above embodiment, the sizes of the respective steps are uniform. However, even non-uniform group size design is workable.

The deviation X of the actual signal distribution from the ideal signal model can be calculated by the following equation:

$$X = \sum_{i=1}^{k} \frac{(h_i - H_i)^2}{Hi}, \tag{1}$$

where k is the total step number (k=8 in this case), $h_i$ is the actual sample number of the samples falling in the i-th step, and $H_i$ is the ideal sample number for the i-th step. Taking the Gaussian distribution case mentioned above as an example, $H_4$=3413. If the deviation X exceeds a threshold $X_{n,a}$, that is:

$$X \geq X_{n,a}, \tag{2}$$

then it is determined that there is jamming. The threshold $X_{n,a}$ is determined by the gain control & jamming detection unit 50 depending on the total sample number n (n=10000 in this case) for the signal and the desired accuracy a.

The checking scheme above is only an example. Any other suitable statistic determination scheme can also be used. For example, besides directly comparing the counted sample number of each step with the expected value, it is also possible to calculate the differences or ratios between the counted sample numbers of the respective steps and judge if the magnitude distribution of the input signal is within an acceptable range with respect to a predetermined signal model according to the calculated differences or ratios. For example, square of differences or chi-square test can be used by the jamming detection part 52 of the gain control & jamming detection unit 50 to check the deviation degree of the signal distribution of the received signal from the ideal distribution.

Figure 4:
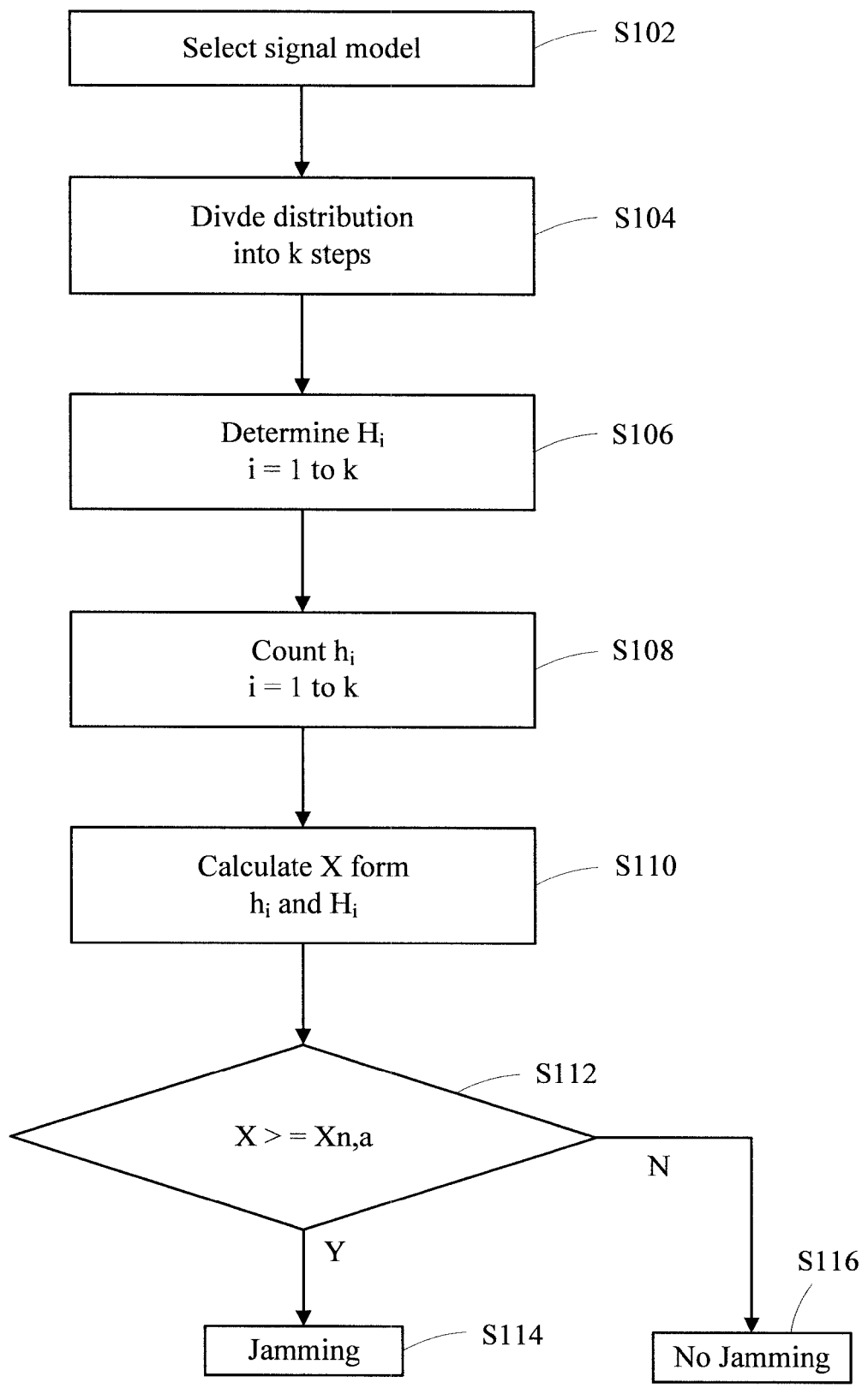
FIG. 4 is a flow chart illustrating a method of an embodiment in accordance with the present invention.

FIG. 4 is a flow chart illustrating the respective steps of the method of the above embodiment in accordance with the present invention. Firstly, a signal model is selected in step S102 of the method. Generally, the AGC unit 30 is set with a predetermined signal model in advance. The gain control & jamming detection unit 50 will judge whether there is jamming by using the predetermined signal model as a reference to check the ADC output. The amplitude distribution of the signal model is divided into k steps (S104). The number k is given in advance. Although the described embodiment deals with the magnitude distribution, other types of distribution such as frequency response are also applicable. Then, ideal sample number $H_i$ (i=1 to k) of each step of the distribution is determined (S106). Generally, the ideal sample numbers $H_i$ can be easily obtained from statistic theories. As described, the ADC 40 samples the signal with a predetermined sampling rate, and the samples of the respective groups are counted by the counters 45 as $h_i$ (S108). One counter 45 is in charge of counting samples of one ADC step or several conjunct steps, or even a group divided by software. The gain control & jamming detection unit 50 calculated a deviation X from $h_i$ and $H_i$ (S110). As mentioned, the deviation X can be calculated by any proper known statistic formula. The gain control & jamming detection unit 50 compares the deviation X with a reference threshold $X_{n,a}$, which is determined according to the total sample number n of a period (sampling rate) of the ADC 40 and a desired accuracy a (S112). Once the deviation X reaches or exceeds the threshold $X_{n,a}$, the gain control & jamming detection unit 50 determines that there is jamming (S114). Otherwise, the gain control & jamming detection unit 50 determines that the signal is jamming-free (S116).

While the preferred embodiment of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A jamming detector for a CDMA-like receiver, said jamming detector comprising:
   a distribution measurement part measuring a signal distribution of the received signal; and
   a jamming detection part comparing the signal distribution measured by the distribution measurement part with a reference distribution and determining whether there is jamming according to the comparison result;
   wherein the reference distribution is divided into a plurality of groups, and the signal distribution is measured based on the groups;
   wherein said distribution measurement part comprises a plurality of counters, each of which counts samples obtained by sampling the signal and meeting a specific condition of one of the groups to obtain a sample number, and said jamming detection part compares the respective sample numbers with reference values of the respective groups for the reference distribution to determine whether there is jamming.

2. The jamming detector of claim 1, wherein the reference distribution is divided into the groups according to signal amplitudes.

3. The jamming detector of claim 2, wherein each group has a predetermined range, and the counters respectively count samples falling in the respective ranges of the groups.

4. The jamming detector of claim 1, wherein the jamming detection part compares a measured result of the signal in each group with a reference value of the reference distribution for the group.

5. The jamming detector of claim 4, wherein the jamming detection part uses one selected from a group at least consisted of difference between measured results of the respective groups, ratio between measured results of the respective groups, square of differences between measured results of the respective groups and chi-square test for measured results of the respective groups to compare with the reference distribution.

6. The jamming detector of claim 1, wherein the reference distribution is of Gaussian signal model.

7. The jamming detector of claim 1, wherein the reference distribution is of single-tone sine wave signal model.

8. A jamming detecting method comprising steps of:
   measuring distribution of a received signal;
   comparing distribution of the signal with a reference distribution; and
   determining if there is jamming in the signal according to the comparison result;
   wherein the step of measuring distribution of a received signal further comprising:
   dividing the reference distribution into a plurality of groups;
   determining an ideal value of samples for each group;
   sampling the signal; and
   counting actual samples of a signal falling in each step to obtain an actual sample number of each group,
   wherein the actual sample numbers are respectively compared with the corresponding reference values of the respective groups in the comparing step.

9. The method of claim 8, wherein the reference distribution is divided into the groups according to signal amplitudes.

10. The method of claim 8, wherein each group has a predetermined range, and the samples falling in the respective ranges of the groups are respectively counted.

11. The method of claim 8, wherein measured result of the signal in each group is compare with the reference value of the reference distribution for the group.

12. The method of claim 8, wherein one selected from a group at least consisted of difference between measured results of the respective groups, ratio between measured results of the respective groups, square of differences between measured results of the respective groups and chi-square test for measured results of the respective groups is used to compare with the reference distribution.

13. The method of claim 8, wherein ratio between measured results of the respective groups are used to compare with the reference distribution.

14. The method of claim 8, wherein the reference distribution is of Gaussian signal model.

15. The method of claim 8, wherein the reference distribution is of single-tone sine wave signal model.

* * * * *